United States Patent
Åkerberg et al.

(10) Patent No.: US 12,395,378 B2
(45) Date of Patent: Aug. 19, 2025

(54) DETERMINISTIC BEHAVIOR IN A SHARED PHYSICAL NETWORK

(71) Applicant: ABB Schweiz AG, Baden (CH)

(72) Inventors: Johan Åkerberg, Västerås (SE); Jörgen Gade, Västerås (SE); Mats Björkman, Västerås (SE); Johan Furunäs, Västerås (SE)

(73) Assignee: ABB Schweiz AG, Baden (CH)

( * ) Notice: Subject to any disclaimer, the term of this patent is extended or adjusted under 35 U.S.C. 154(b) by 347 days.

(21) Appl. No.: 18/055,567

(22) Filed: Nov. 15, 2022

(65) Prior Publication Data
US 2023/0155861 A1    May 18, 2023

(30) Foreign Application Priority Data
Nov. 15, 2021 (EP) ..................... 21208205

(51) Int. Cl.
*H04L 12/46* (2006.01)
*H04L 43/0882* (2022.01)
*H04L 47/2475* (2022.01)
*H04L 47/28* (2022.01)

(52) U.S. Cl.
CPC ...... *H04L 12/4641* (2013.01); *H04L 43/0882* (2013.01); *H04L 47/2475* (2013.01); *H04L 47/28* (2013.01)

(58) Field of Classification Search
CPC ............. H04L 12/4641; H04L 43/0882; H04L 47/2475; H04L 47/28; H04L 49/351; H04L 47/22; H04L 47/2441; H04L 47/24; H04L 47/2433; H04L 12/4645
See application file for complete search history.

(56) References Cited

U.S. PATENT DOCUMENTS

| | | | |
|---|---|---|---|
| 6,111,876 A * | 8/2000 | Frantz | H04L 12/4641 370/469 |
| 7,855,972 B2 * | 12/2010 | Pettit | H04L 63/0263 370/254 |
| 11,353,855 B1 * | 6/2022 | Hahn | G05B 19/41855 |
| 2007/0133549 A1 | 6/2007 | Lee et al. | |
| 2021/0111926 A1 * | 4/2021 | Tregenza | H04L 45/64 |

FOREIGN PATENT DOCUMENTS

EP    2066081 A1    6/2009

OTHER PUBLICATIONS

Korner, Marc, et al; "An approach for QoS constraint networks in cloud environments"; 2013 Fourth International Conference on the Network of the Future (NoF); IEEE; Pohang, Korea (South); Oct. 23, 2013; 3 Pages.
Extended European Search Report; Application No. 21208205.1; Completed: Apr. 6, 2022; Issued: Apr. 19, 2022; 8 Pages.

* cited by examiner

*Primary Examiner* — Kibrom T Hailu
(74) *Attorney, Agent, or Firm* — Whitmyer IP Group LLC

(57) ABSTRACT

A method for providing a deterministic behavior in a shared physical network is disclosed. The method may be performed in a device controlling a Virtual Local Area Network, VLAN, of the shared physical network. The method includes rate limiting amount of inbound traffic for each traffic flow in the VLAN and assigning a respective priority for each traffic flow in the VLAN.

9 Claims, 2 Drawing Sheets

DETERMINISTIC BEHAVIOR IN A SHARED PHYSICAL NETWORK

TECHNICAL FIELD

The technology disclosed herein relates generally to the field of industrial networks, and in particular to a method, a device, computer program and computer program product for providing a deterministic behavior in a shared physical network.

BACKGROUND

Industrial networks are often, for various reasons, handled as separate networks. A common reason for using separated networks is to make automation networks behave in a deterministic way, wherein no other traffic can disturb; commonly in order to provide e.g., a guaranteed capacity and delay. Some Ethernet-based fieldbuses use a Quality-of-Service (QoS), provided by Ethernet standards, giving critical traffic higher priority than non-critical traffic. Further reasons for separating networks are based on availability and/or security perspectives. However, the network separation may lead to fragmentation and required information not being readily available for various functionalities that are needed in automation systems. Larger process automation installations utilize Virtual Local Area Networks (VLANs) to consolidate control networks and client/server networks. However, such measures fail to provide guarantees for the desired deterministic behavior, and may also cause spurious problems, such as, for instance, a large backup procedure consuming the entire network capacity.

From the above it is realized that the current industrial networks involve several drawbacks. On the one hand, it would be desirable for all automation equipment to share the same physical network since this would simplify the exchange of information. On the other hand, such shared network may lead to security problems and also result in critical traffic failing to get the required capacity.

SUMMARY

The objective of the present invention is to address and improve various aspects for industrial networks. A particular objective is to enable use of a single physical network for automation equipment while still maintaining a secure and safe functioning thereof. Another particular objective is to prevent high-priority traffic from consuming all network capacity, and thus avoiding to completely starve lower prioritized traffic during those periods. These objectives and others are achieved by the methods, devices, computer programs and computer program products according to the appended independent claims, and by the embodiments according to the dependent claims.

The objective is according to a first aspect achieved by a method for providing a deterministic behavior in a shared physical network. The method is performed in a device controlling a Virtual Local Area Network (VLAN) of the shared physical network. The method comprises rate limiting the amount of inbound traffic for each traffic flow in the VLAN and assigning a respective priority for each traffic flow in the VLAN.

The objective is according to a second aspect achieved by a VLAN configured for providing a deterministic behavior in a physical network. The VLAN is communicating over Ethernet, and the VLAN is configured to rate limit amount of inbound traffic for each traffic flow in the VLAN, and to assign a respective priority for each traffic flow in the VLAN.

The objective is according to a third aspect achieved by a computer program for a device controlling a VLAN of a shared physical network. The computer program comprises computer program code, which, when run on at processing circuitry of the device causes the device to perform the method according to the first aspect.

The objective is according to a fourth aspect achieved by a computer program product comprising a computer program according to the third aspect and a computer readable means on which the computer program is stored.

These aspects method provides a number of advantages. For instance, it is ensured that critical traffic obtains its required capacity, although using a single physical network. Further, by having all automation equipment share the same physical network the exchange of information is simplified, while also preserving or even increasing the level of security, predictability, safety, and availability of the physical network. The present invention provides methods and means for paving way for further advances towards a next generation of automation systems in the era of digitalization.

Further features and advantages of the embodiments of the present teachings will become clear upon reading the following description and the accompanying drawings.

DETAILED DESCRIPTION

Figure 1:
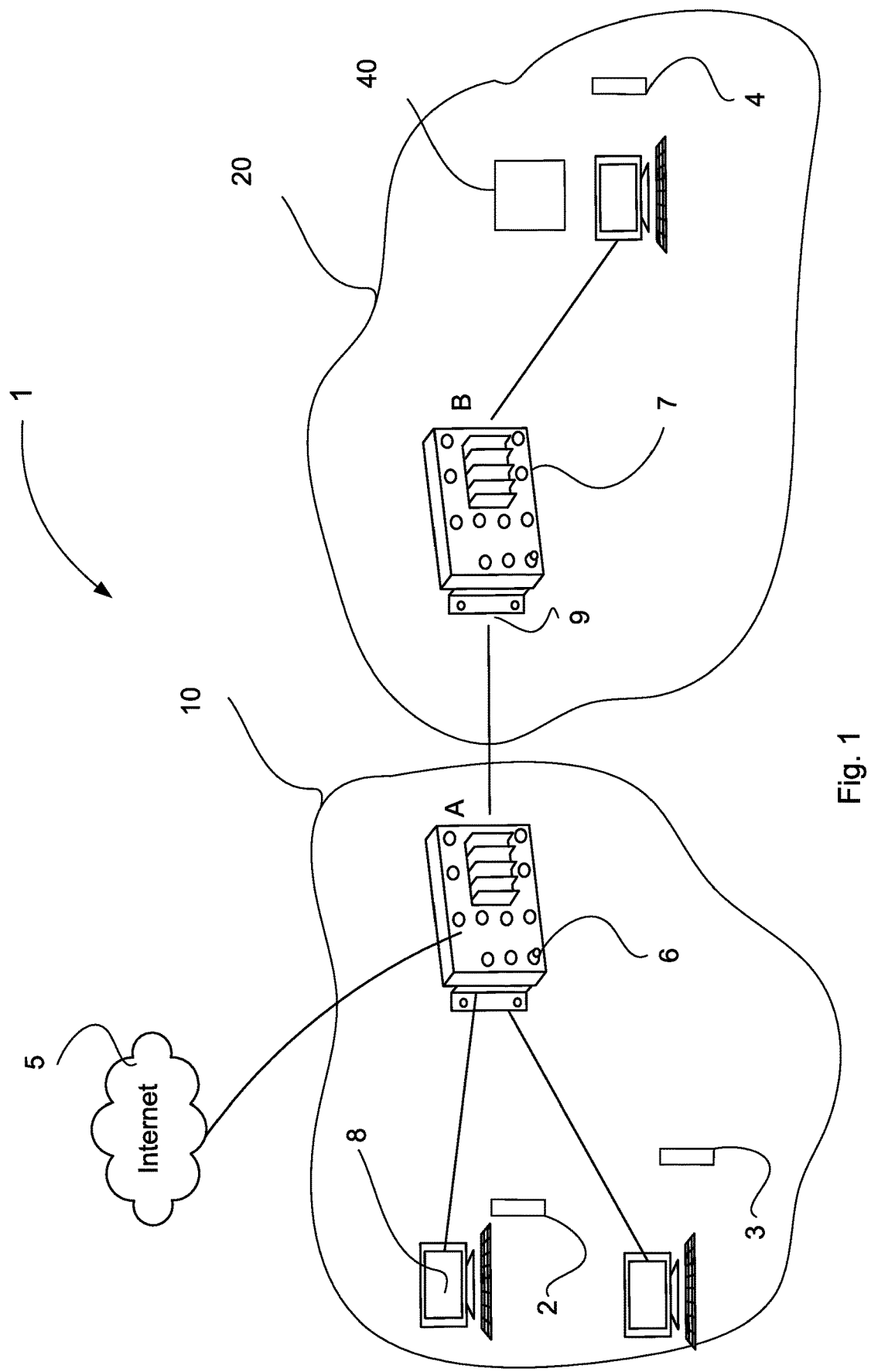
FIG. 1 is a schematic diagram illustrating a network in which embodiments may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the herein described embodiments relate to Rate-Limited VLANs allowing for prioritization of different traffic classes/types, while also providing guaranteed capacity in the VLANs, in a single shared physical network (in the following also denoted network). Taken together this enables a deterministic behavior in the network, as well as bound network delays, which are two paramount requirements in automation systems. Further, in various embodiments, best effort traffic can still exist and consume the remaining capacity of the network while maintaining the deterministic behavior of the critical traffic.

FIG. 1 illustrates an environment in which embodiments according to the invention may be implemented. The physical network 1, e.g., a computer network, a local area network (LAN) or a wide area network (WAN), typically comprises various types of cables interconnecting different pieces of hardware that are part of the network 1. The hardware may, for instance, comprise interconnected computers 2, 3, 4, repeaters, switches, routers 6, 7, workstations 8, Internet access 5 etc., connected to the network 1. The network 1 is thus a group of hardware sharing a communications line and/or wireless link to a server. The network 1 may, e.g., use Standard Ethernet, IEEE 802.3 Ethernet. In the Ethernet network there is a high amount of broadcast data sent directly to all network devices, which may lead to network jitter.

A VLAN is a switched network that is logically segmented by, for instance, function, or application. The VLAN may be seen as a subnetwork which groups together devices of separate physical LANs to form a virtual network. Broadcast and unicast traffic within a certain VLAN is not forwarded to other VLANs, thereby reducing network jitter. In the physical network 1 of FIG. 1, a first VLAN may comprise two computers 2, 3 and a first router 6, and a second VLAN may comprise one computer 4 and one router 7.

Ethernet allows for Quality of Service (QoS) by using priorities in an IEEE 802.1Q tag, which also contains fields for VLAN separation. The VLAN and QoS enables reduced jitter and worst-case packet delays for the high-priority traffic in the network 1. However, high-priority traffic may consume all the capacity in the network 1, thus starving the lower prioritized traffic completely during those periods.

The typical use-case for VLANs is to partition the physical network 1 for achieving improved security and performance. The VLAN also allows for simplified physical network maintenance when equipment is physically removed and also enables simplified network expansions. The same advantages are beneficial in industrial networks as well but is rarely used for the same reasons as in corporate networks.

By combining the use of VLANs and its priorities with rate-limiting the amount of traffic that can flow in a VLANs, the present invention enables, in various embodiments, a deterministic behavior in the shared physical network 1. The shared physical network 1 is a deterministic system since considering the given priority levels, the worst-case delay of the traffics in each VLAN can be calculated. This enables verification of the expected performance and provide the determinism of the system.

The concept of Rate-Limited VLANs enables the "informational technology (IT)/operational technology (OT) integration" in different ways. It provides the determinism for the time-critical OT traffic by eliminating the starvation problem and offering predictable worst-case delays for the prioritized traffic. Further, the concept allows both OT and IT traffic in the same physical network with same strategy as non-scheduled traffic classes from IEC60802 and brings possibilities of implementing best IT practices for enhanced security, partitioning and network expansions while there is no need for change in the automation system (endpoints).

A rate-limiter 9 ensures that high priority traffic cannot consume all available capacity, thus providing capacity guarantees for the other remaining priorities for traffic in a recursive manner. This gives predictable worst-case delays while allowing IT traffic in the automation networks. The rate-limiter 9 may be applied on access ports or on trunk ports, or both. In order to set bandwidth limitation parameters, a prior knowledge of traffic in the network should be available, such that high priority traffic can be sent within an expected time. That is, the bandwidth limitation parameters may be based on prior knowledge of traffic.

The presented teachings may be deployed in many different ways in real installations. TSN enables fine-grained control and further jitter reduction, but requires changes in network infrastructure, endpoints, and engineering toolchains. In this context, an important use case of the invention is that it allows for a stepwise introduction of the benefits of TSN, while also providing support for currently used products and systems. For instance, a first step may be to use the network infrastructure to handle the rate limited VLANs 10, 20 without having to change the behavior of existing products and/or systems. Intermediate steps may comprise moving parts of a functionality into automation equipment, in order to simplify engineering and allowing for more complex cross-VLANs communication flows, or when an endpoint needs to be part of more than one VLAN. An advantage is thus that the invention enables and allows for a stepwise transition towards collapsed and harmonized networks, by using existing functionality in enterprise switches and routers, towards Time Sensitive Networking (TSN).

In various aspects, the invention uses VLANs and ingress limiting at multiple locations in order to deterministically handle worst-case delays in the network. In contrast to prior art, in which determinism is enabled by using dedicated networks, the present teachings do not require two disjoint VLANs. All traffic classes are rate-limited in order to guarantee that the desired deterministic delays are not exceeding the available memory. This leads to that low priority traffic, such as e.g., TCP, cannot cause packet loss of high priority traffic.

When a network experiences congestion and delay, some packets must be prioritized to avoid random loss of data. Quality of Service (QoS), also known as Class of Service (CoS), accomplishes this prioritization by dividing similar types of traffic, such as e-mail, streaming video, voice, large document file transfer, into classes. By applying different levels of priority, such as those for throughput and packet loss, to each group, traffic behavior can be controlled. For example, when packets must be dropped, it is ensured that packet losses take place according to the configured rules.

Figure 2:
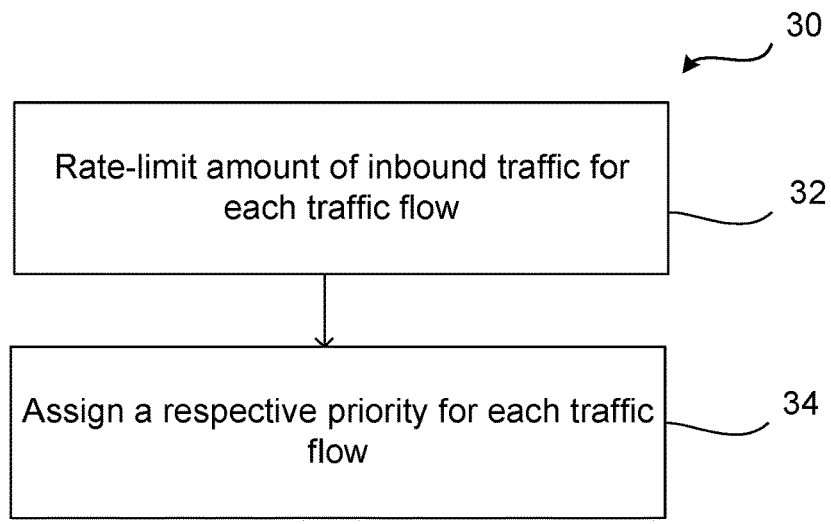
FIG. 2 is a flowchart of methods in accordance with embodiments.

FIG. 2 is a flowchart of methods in accordance of embodiments. The method 30 provides a deterministic behavior in a shared physical network 1, such as the network 1 described in relation to FIG. 1. The method 30 may be performed in a device 40, for instance a processing device, controlling a Virtual Local Area Network, VLAN, 10, 20 of the shared physical network 1. The method 30 comprises rate limiting 32 the amount of inbound traffic for each traffic flow in the VLAN 10. The provided rate limited VLANs 10, 20 enables determinism. By limiting the network capacity of, for instance, the prioritized traffic, starvation of other traffic types is avoided. The method also allows both OT traffic and IT traffic in the same physical network. The method 30 further enables implementation of best possible IT practices, which gives enhanced security, partitioning and network expansions.

The method 30 comprises assigning 34 a respective priority for each traffic flow in the VLAN 10, 20.

As noted earlier, the method 30 provides a number of advantages. For instance, the method ensures that critical traffic obtains its required capacity, although using a single physical network 1. All automation equipment may share this physical network 1, which simplifies the exchange of information, while also at least preserving the current level of security, predictability, safety, and availability of the physical network. The present invention provides methods and means for paving way for further advances towards a next generation of automation systems in the era of digitalization. By combining the use of VLANs and its priorities, with an addition of rate-limiting the amount of traffic that can flow in a VLANs, this method enables deterministic behavior in the shared physical network.

The rate-limiting may be performed in various different ways. In an embodiment of the method 30, the rate limiting 32 comprises setting a certain bandwidth limitation for each traffic flow based on prior knowledge of traffic in the network 1 by using a monitoring tool that provides an estimation of the required bandwidth and/or by previous knowledge of application demand. The rate-limiter, that can be applied both on access ports or on trunk ports (or both), ensures that high priority traffic cannot consume all available capacity, thus providing capacity guarantees for the other remaining priorities in a recursive manner. This gives predictable worst-case delays while allowing IT traffic in the automation networks.

In various embodiments of the method 30 an information technology traffic flow and an operational technology traffic flow are allowed in the shared physical network 1.

In various embodiments, the rate limiting 34 is performed in one or both of: an access port and a trunk port.

In various embodiments, the shared physical network 1 controls, by means of e.g., a process control system, an automation system, which is a system performing one or more functions with essentially no human intervention. Examples of such systems comprise, for instance, electricity generating plants, assembling and processes in factories.

In various embodiments, the VLAN 10 implements an IEEE 802.1Q Standard. In such embodiments, the shared physical network 1 may be an IEEE 802.3 Ethernet network.

Figure 3:
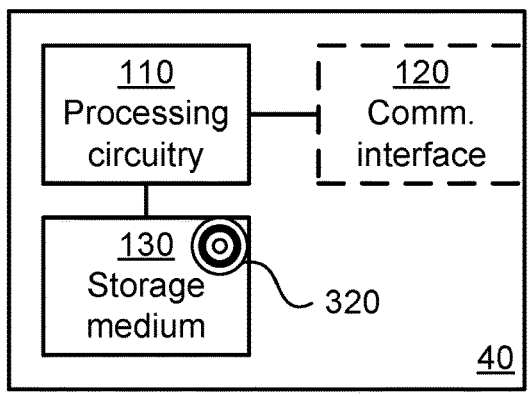
FIG. 3 is a schematic diagram showing functional units of a device according to an embodiment.

FIG. 3 schematically illustrates, in terms of a number of functional units, the components of a device 40 according to an embodiment. Processing circuitry 110 is provided using any combination of one or more of a suitable central processing unit (CPU), multiprocessor, microcontroller, digital signal processor (DSP), etc., capable of executing software instructions stored in a computer program product 330 (as in FIG. 5), e.g., in the form of a storage medium 130. The processing circuitry 110 may further be provided as at least one application specific integrated circuit (ASIC), or field programmable gate array (FPGA).

Particularly, the processing circuitry 110 is configured to cause the device 40 to perform a set of operations, or actions, as disclosed herein. For example, the storage medium 130 may store the set of operations, and the processing circuitry 110 may be configured to retrieve the set of operations from the storage medium 130 to cause the device 40 to perform the set of operations. The set of operations may be provided as a set of executable instructions. The processing circuitry 110 is thereby arranged to execute methods as herein disclosed.

The storage medium 130 may also comprise persistent storage, which, for example, can be any single one or combination of magnetic memory, optical memory, solid state memory or even remotely mounted memory.

The device 40 may further comprise a communications interface 120 for communications with other entities, functions, nodes, and devices, over the interfaces as illustrated in FIG. 1. As such the communications interface 120 may comprise one or more transmitters and receivers, comprising analogue and digital components.

The processing circuitry 110 controls the general operation of the device 40 e.g., by sending data and control signals to the communications interface 120 and the storage medium 130, by receiving data and reports from the communications interface 120, and by retrieving data and instructions from the storage medium 130. Other components, as well as the related functionality, of the device 40 are omitted in order not to obscure the concepts presented herein.

Figure 4:
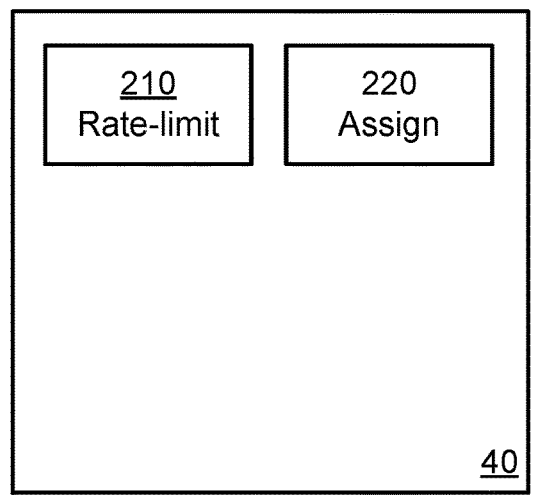
FIG. 4 is a schematic diagram showing functional modules of a device according to an embodiment.

FIG. 4 schematically illustrates, in terms of a number of functional modules, the components of a device 40 according to an embodiment. The device 40 of FIG. 4 comprises a number of functional modules; a rate limiter 210 configured to perform step 32 of the method 30, and an assign module 220 configured to perform step 34 of the method 30. The device 40 of FIG. 4 may further comprise a number of optional functional modules, to perform further actions of the method 30. In general terms, each functional module 210, 220 may be implemented in hardware or in software. Preferably, one or more or all functional modules 210, 220 may be implemented by the processing circuitry 110, possibly in cooperation with the communications interface 120 and the storage medium 130. The processing circuitry 110 may thus be arranged to from the storage medium 130 fetch instructions as provided by a functional module 210, 220 and to execute these instructions, thereby performing any actions of the device 40 as disclosed herein.

Figure 5:
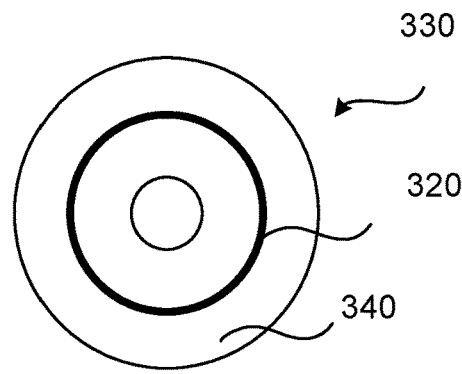
FIG. 5 shows one example of a computer program product comprising computer readable means.

FIG. 5 shows one example of a computer program product 330 comprising computer readable means 340. On this computer readable means 340, a computer program 320 can be stored, which computer program 320 can cause the processing circuitry 110 and thereto operatively coupled entities and devices, such as the communications interface 120 and the storage medium 130, to execute methods according to embodiments described herein. The computer program 320 and/or computer program product 330 may thus provide means for performing any actions of the device 40 as herein disclosed.

In the example of FIG. 5, the computer program product 330 is illustrated as an optical disc, such as a CD (compact disc) or a DVD (digital versatile disc) or a Blu-Ray disc. The computer program product 330 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 330.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for providing a deterministic behavior in a shared physical network, the method being performed in a device controlling a Virtual Local Area Network, VLAN, of the shared physical network, the method comprising:

rate limiting an amount of inbound traffic for each traffic flow in the VLAN wherein the rate limiting includes setting a certain bandwidth limitation for each traffic flow based on prior knowledge of traffic in the shared physical network by using a monitoring tool that provides an estimation of the required bandwidth and/or by previous knowledge of application demand, assigning a respective priority for each traffic flow in the VLAN, and allowing an information technology traffic flow and an operational technology traffic flow in the shared physical network, wherein the shared physical network controls an automation system.

2. The method as claimed in claim 1, comprising performing the rate limiting in one or both of: an access port and a trunk port.

3. The method as claimed in claim 1, wherein the VLAN implements an IEEE 802.1Q Standard.

4. The method as claimed in claim 3, wherein the shared physical network is an IEEE 802.3 Ethernet network.

5. A Virtual Local Area Network, VLAN, configured for providing a deterministic behavior in a physical network, the VLAN communicating over Ethernet, and the VLAN being configured to:

rate limit an amount of inbound traffic for each traffic flow in the VLAN, wherein the VLAN is configured to set a certain bandwidth limitation for each traffic flow based on prior knowledge of traffic in the shared physical network by using a monitoring tool that provides an estimation of the required bandwidth and/or by previous knowledge of application demand, assign a respective priority for each traffic flow in the VLAN, and allow an information technology traffic flow and an operational technology traffic flow in the shared physical network, wherein the shared physical network controls an automation system.

6. The VLAN as claimed in claim 5, configured to perform the rate limiting in one or both of: an access port and a trunk port.

7. The VLAN as claimed in claim 5, implementing an IEEE 802.1Q Standard.

8. A computer program stored on a non-transitory computer-readable medium and configured for a device controlling a Virtual Local Area Network, VLAN, of a shared physical network, the computer program comprising computer program code, which, when run on processing circuitry of the device causes the device to perform a method of providing a deterministic behavior in the shared physical network, the method including:

rate limiting an amount of inbound traffic for each traffic flow in the VLAN, wherein the rate limiting includes setting a certain bandwidth limitation for each traffic flow based on prior knowledge of traffic in the shared physical network by using a monitoring tool that provides an estimation of the required bandwidth and/or by previous knowledge of application demand, assigning a respective priority for each traffic flow in the VLAN, and allowing an information technology traffic flow and an operational technology traffic flow in the shared physical network wherein the shared physical network controls an automation system.

9. A computer program product comprising:

a non-transitory computer-readable medium, and a computer program stored on the computer-readable medium and configured for a device controlling a Virtual Local Area Network, VLAN, of a shared physical network, the computer program comprising computer program code, which, when run on processing circuitry of the device, causes the device to perform a method of providing a deterministic behavior in the shared physical network, the method including:

rate limiting an amount of inbound traffic for each traffic flow in the VLAN, wherein the rate limiting includes setting a certain bandwidth limitation for each traffic flow based on prior knowledge of traffic in the shared physical network by using a monitoring tool that provides an estimation of the required bandwidth and/or by previous knowledge of application demand, assigning a respective priority for each traffic flow in the VLAN, and allowing an information technology traffic flow and an operational technology traffic flow in the shared physical network, wherein the shared physical network controls an automation system.

* * * * *